United States Patent

Yang et al.

[11] Patent Number: 5,856,977
[45] Date of Patent: Jan. 5, 1999

[54] DISTRIBUTION NETWORK SWITCH FOR VERY LARGE GIGABIT SWITCHING ARCHITECTURE

[76] Inventors: Muh-rong Yang, 2F-1, No. 6 Ln 13, Ching-hau Street, Ching-Mei, Taipei; Gin-Kou Ma, 9, In. 328, Sec. 3, Chung Hsing Rd., Chutung, both of Taiwan

[21] Appl. No.: 856,557

[22] Filed: May 15, 1997

[51] Int. Cl.$^6$ .................................................. H04L 12/28
[52] U.S. Cl. ...................... 370/411; 370/395; 370/411; 370/412; 370/413
[58] Field of Search .................................. 370/411, 389, 370/395, 412, 428, 413, 419, 361, 370, 371, 372, 376, 378, 380, 387, 388; 340/825.79, 825.8

[56] References Cited

U.S. PATENT DOCUMENTS

| | | | |
|---|---|---|---|
| 5,157,654 | 10/1992 | Cisneros | 370/414 |
| 5,179,552 | 1/1993 | Chao | 370/427 |
| 5,412,646 | 5/1995 | Cyr et al. | 370/411 |
| 5,724,352 | 3/1998 | Cloonan et al. | 370/395 |

*Primary Examiner*—Douglas W. Olms
*Assistant Examiner*—Phirin Sam
*Attorney, Agent, or Firm*—Proskauer Rose LLP

[57] ABSTRACT

An inventive switch for transporting information cells without cell contention is described. The switch includes at least one parallel distribution network. Each distribution network includes an N×N first routing network for receiving cells at a plurality of input ports, where N equals the number the input ports. Illustratively, the routing network is self-routing and non-blocking, such as a Banyan Network. Connected to the N×N network are $\rho^k$ groups of shared buffers for storing the cells routed through the network for a period of time not greater than one cell cycle, where k is incremented from 1 to $[\log_2 N / \log_2 \rho]^{-1}$ and $\rho$ equals a predetermined speed-up factor. In one aspect of this embodiment, the number of shared buffers is simply equal to $N/\rho$. To prevent cell contention and cell loss, all of the contentious cells (cells destined for the same output during the same cycle) are stored in the same shared buffer. Connected to the shared buffers are $\rho^k$ groups of $(N/\rho^k) \times (N/\rho^k)$ routing networks each having a plurality of output ports for outputting the cells, stored in the shared buffers, based on the destination addresses of each cell. Due in part to the utilization of $\rho^k$ groups of shared buffers, a large reduction in both hardware costs and chip real estate is realized. Specifically, a decrease in the number of switching stages is achieved.

28 Claims, 8 Drawing Sheets

DISTRIBUTION NETWORK SWITCH FOR VERY LARGE GIGABIT SWITCHING ARCHITECTURE

FIELD OF THE INVENTION

The present invention relates generally to switching system, and, more particularly, the present invention relates to a distribution network switching system for transporting information cells from an incoming channel to an outgoing channel by distributing such cells through a switching system having an N×N switching network, recursively connected to $\rho^k$ groups of shared buffers, and $(N/\rho^k)$ groups of $(N/\rho^k) \times (N/\rho^k)$ routing networks, where k is incremented from 1 to $[\log_2 N / \log_2 \rho]^{-1}$, and $\rho$ is the speed-up factor.

BACKGROUND OF THE INVENTION

1. Introduction

Recently, substantial research effort has been devoted to the development of ATM (asynchronous transfer mode) or fast packet switches due to its capability of sup porting diverse traffic requirements with high performance. In general, two classification schemes have been identified to characterize the numerous ATM switching architectures. One classification scheme is based on buffering strategies used for temporary storing the cells to be switched and the other classification is based on the architectural design of the switches themselves.

According to the classification scheme based on buffering strategies, four types of queuing disciplines have been identified, which differ by the physical location of the buffers: the input queuing switches with buffers at the input ports of the switches (FIG. 1), the output queuing switches with buffers at the output ports of the switches (FIG. 2), the shared queuing switches with buffers at the center of the switches (FIG. 3), and various combinations of the above (not shown).

Briefly, the input queuing approach, illustrated in FIG. 1, was developed to solve possible contention problems at the input. A contention occurs when two or more cells are destined for the same port during one cycle. For example, if two cells are destined for the same output port of the switch, there is an input or output contention, respectively. To solve such contention problems, each inlet 0–3 of the switch 10 disposes of a dedicated buffer 15 which stores the incoming cells so that multiple cells will not be transferred through the same outlets of the switching elements β. Note that each element includes two inlets and two outlets. However, the disadvantages of input queuing switches include having a maximum throughput of approximately 58% due to head-of-the-line (HOL) blocking.

The output queuing approach, illustrated in FIG. 2, was developed to solve possible contention problems at the output. Each outlet 0–3 of the switch 20 disposes of a dedicated buffer 25 which allows it to store multiple cells which may arrive during one cell cycle. Although output queuing switches can achieving 100% throughput efficiency, the disadvantages include the necessity that the cell transfer must be performed at N times the speed of the inlets. In other words, in a 64×64 network, the cell transfer must be performed at a bandwidth of 64 times the inlet bandwidth.

With respect to the central queuing approach, shown in FIG. 3, the single queue 30 is not dedicated to a single inlet or outlet 0–3 but is shared between all inlets and outlets. In this scheme, each incoming cell will be stored in the central buffer, while every outlet will select the cells which are destined therefor. However, while central queuing switches can achieving 100% throughput efficiency, this discipline requires a complex memory management system to manage the stored cells.

Shared queuing disciplines (not shown) combine any of the input, output and central queuing techniques, and accordingly share the same respective disadvantages, discussed above, with the addition of a larger size.

Switching architectures based on their architectural design can be classified into three categories: shared-memory switches, shared-medium switches, and space-division switches. The primary implementation constraint of building a shared-memory switch comes from the necessity of having a very high memory bandwidth. The memory control logic has to be able to process N incoming cells and route N outgoing cells to their destinations. Thus, a bandwidth of 2N cells into and out of the memory, within a timeslot or cycle, has to be maintained. The so-called "bit-sliced" technique has been used to help achieve the required memory bandwidth.

With respect to shared-medium switches, the primary implementation constraint relates to the bandwidth of output filters. The filters, in the worst case, have to process N cells, within a timeslot, and thus have to sustain a flow of N cells per timeslot. Similarly, the bit-sliced technique is a common solution to help achieve the required bandwidth. Regarding space-division switches, although there are multiple paths from the inlet to the outlet ports, there are output contention and internal switch conflicts that occur. To solve the contention problems, the so-called "speed-up" technique is often employed. The speed-up technique basically runs each switching element in the switching fabric at an increased speed proportionate to the number of inlets, so that each cell can transfer in successive switch cycles. In other words, if there are 64 inlets, the switches are sped up by a factor of 64 so that each inlet can operate cyclically during one cycle T.

Accordingly, the internal switching fabric in all of the above switching architectures must employ either bit-slicing or speed-up to achieve the required bandwidth and to resolve output contention. However, due to the small size of ATM cells that typically transfer through the switching network, the bit-sliced technique will prove inadequate. Further, with respect to conventional applications of the speed-up technique, since the all of the input cells must be buffered, the speed-up is limited to the speed of the buffer. For example, SRAMs are typically used for such a buffer. As is known, most SRAMs operate at a maximum speed of 10 ns, thereby limiting the possible speed of the network.

2. Multistage Interconnection Networks (MINs)

A MIN is typically formed of a large number of inlets and outlets (e.g. up to the tens of thousands) coupled together in a switching fabric comprising numerous identical switching building blocks or elements. An example of a 8×8 MIN is shown in FIG. 4. Specifically, the MIN of FIG. 4 comprises 3 stages 0–2 of multiple switching elements β, where each stage includes 4 such elements β. If two cells appear at the outlet of any element during one cell cycle, the element is "in the conflict state". A conflict element occurring in stage 0 or 1 would be known as an internal blocking or input contention, while a conflict element occurring in stage 2 would be known as an output contention.

a. Batcher-Banyan based MINs

A Banyan network is the most common type of MIN. Types of Banyan networks include baseline, generalized cube, shuffle-exchange, indirect binary n-cube, and omega networks. As will be described later, the major property of a Banyan network is that the switching fabric is self-routing, i.e. there exists exactly one path from any input to any output. Further, cells that appear at the input of the Banyan network can route through the network based on the binary representation of the output. As with the switching fabric of a typical MIN, the basic building block of the Banyan network is a 2×2 β switching element. These switching elements are used to form an N×N Banyan network 50 which is typically built using two N/2×N/2 Banyan subnetworks, as shown in FIG. 5. FIG. 6 illustrates a 16×16 Banyan network 52, i.e. a Banyan network having 16 inputs and 16 outputs and comprising two 8×8 subnetworks.

Banyan networks have been categorized as self-routing, as well as, blocking networks. In other words, each β element can determine its switching state from the binary destination address of its own input. Nevertheless, some of the connections may be blocked as multiple concurrent paths are being established from the inputs to the outputs. However, it is known that if output addresses of the active inputs are arranged in a monotonically ascending or a descending order, the Banyan networks become non-blocking. Thus, it is desirable to have the cells sorted according to their addresses. For example, a Batcher network or running adder network is typically added before the Banyan network (called a Batcher-Banyan Network) to create a non-blocking environment for the transport of ATM and fast packet switches. In particular, the Batcher sorter places the cells with the lower destination addresses at the upper outlet of the sorter. However, although the Batcher-Banyan network solves internal switch contention problems, output contention concerns remain.

b. Starlite Switch

The Starlite switch, shown in FIG. 7, was the first fast packet switch that adopted the Batcher-Banyan architecture. Besides having the standard Batcher-Banyan network as its routing network (i.e., the Batcher sorter 60 and Banyan Network 50), the Starlite switch includes trap and concentrator networks, 70 and 80, respectively. Further, input port controllers IPC 55 transfer the incoming cells to the switch.

In short, to overcome the output contention problem of the Batcher-Banyan network, the Starlite switch adds trap network 70 therebetween. The trap network detects cells which are simultaneously arriving at the output of the Batcher network with the same output destination. These conflicting cells are fed through concentrator 80 and back to the entrance of the Batcher sorter 60, via shared recirculating queue 90, to try again in the next cycle.

c. St. Louis switching fabric

Turner proposed a buffered Banyan switch that was not specifically designed for fixed length ATM cells but for switching variable length packets. As shown in FIG. 8, the switch includes a copy network (CN) 92, a plural of broadcast and group translators (BGTs) 94, a distribution network (DN) 96, and a self-routing network (RN) 98 (such as a Banyan network). The CN 92 generates copies of packets to its output according to a pre-defined request. The BGTs 94 perform the header translation to determine the proper destination addresses of the cells. The DN 96 randomizes the incoming packets over all its outlets. This is done so that on its outlets (the inlets of RN 98), the traffic is uniformly distributed over all the links to prevent internal contention (and thus internal cell loss) within the RN. Finally, packets are routed through the RN 98 to their destinations using the header information. If two packets conflict for an output of a switching element, one packet has to be buffered internally.

d. Omega Multinet switch

As shown in FIG. 9, the Omega N×N Multinet switch consists of $\log_2 N$ stages of concentrators with FIFO buffers. Each stage is labeled from 0 to $\log_2 N-1$ and the ith stage of the N×N switch is composed of N 1×2 demultiplexers and $2^{i+1}$ concentrators of size $2^{n-i+1} \times 2^{n-i+i}$.

Arriving cells are divided into two groups at each stage according to their first bit of the destination addresses. Each concentrator consists of a reverse Banyan network and a FIFO buffer. The fetch-and-add technique is to use to create a non-blocking environment for the reverse Banyan network.

However, the Batcher-Banyan, St. Louis and Omega switch architectures all require a large amount of switching elements and switching stages to ensure that a non-blocking switch, free of input, internal and output contention, is achieved.

3. Objectives

It is therefore an object of the present invention to provide a switching architecture having a non-blocking network that is free of input, internal and output cell contention.

Another object of the present invention is to provide a switching architecture that uses the speed-up technique which divides the input ports into a plurality of modulo groups.

A further object of the present invention is to provide a switching architecture that utilizes fewer switching stages, and therefore, fewer switching elements to save chip space.

An additional object of the present invention is to provide a switching architecture that switches cells in accordance with the Universal Packet TimeSlot (UPTS) technique.

Yet another object of the present invention is to provide a switching architecture for moderate large dimension (MLD) and very large dimension (VLD) switches.

SUMMARY OF THE INVENTION

These and other objects are achieved by the present invention. In one embodiment, a switch for transporting information cells without cell contention and cell loss is described. The switch includes at least one parallel distribution network. Each distribution network includes an N×N first routing network for receiving cells at a plurality of input ports, where N equals the number the input ports. Illustratively, the routing network is self-routing and non-blocking. Preferably, the routing network is a Banyan Network. Connected to the N×N network are $\rho^k$ groups of shared buffers for storing the cells routed through the N×N network for a period of time not greater than one cell cycle, where k equals $[\log N/\log_2 \rho]^{-1}$ and $\rho$ equals a predetermined speed-up factor. In one aspect of this embodiment, the number of shared buffers is simply equal to $N/\rho$. To prevent cell contention, all of the contentious cells (cells destined for the same output during the same cycle) are stored in the same shared buffer. Connected to the shared buffers are $\rho^k$ groups of $(N/\rho^k) \times (N/\rho^k)$ second routing networks each having a plurality of output ports for outputting the cells, stored in the shared buffers, based on the destination addresses of each cell.

Illustratively, k begins at a value of 1 so there are only $\rho$ groups of $(N/\rho) \times (N/\rho)$ second routing networks. Connected to the $\rho$ groups of $(N/\rho) \times (N/\rho)$ second routing networks are $\rho^2$ groups of second shared buffers, and connected to the second shared buffers are $\rho^2$ groups of $N/\rho^2 \times N/\rho^2$ third routing networks. Additional shared buffers and routing networks may be added until, connected to the $\rho^k$ groups of shared buffers are, $\rho^k$ groups of $(N/\rho^k) \times (N/\rho^k)$ $k^{th}$ routing networks.

As stated, to prevent cell contention, all of the contentious cells are stored in the same shared buffer. In this manner, since the speed-up factor ρ (the factor indicating the increase in switching speed during each cell cycle) equals the number of input ports dedicated to a shared buffer, the switch can successively transport all contentious cells stored in each buffer to the destined output port during one cycle.

Although many conventional ATM network switches use the speed-up technique to essentially eliminate input contention problems, the number of inputs must equal the speed-up factor. However, the speed-up factor is limited by the speed of the buffers that store the incoming cells, so that for a large switch, e.g. 1024×1024, the speed-up factor typically can not equal the number of inputs, i.e. 1024.

To overcome this problem and as a further aspect of this embodiment, the inputs of each routing network are organized into "speed-up channel" (SUCH) groups. A SUCH group is formed by the number of input ports modulo η, where η, fixed by the memory access time, equals the speed-up factor ρ. Accordingly, there are N/ρ SUCH groups connected to the N×N first routing network. Each SUCH group corresponds to one of the several shared buffers.

As an additional aspect of the invention, the inventive switch which has at least one parallel distribution network may be connected to another switch also having at least one parallel distribution network. Illustratively, the multiple switches may be connected via demultiplexers. In this manner two moderate large dimension (MLD) switches are expanded to form one very large dimension (VLD) switch.

In a second embodiment of the invention, the switch, described in the first embodiment, transports Universal Packet TimeSlot (UPTS) information cells. Further, the switch includes more than one parallel distribution network, wherein each parallel distribution network simultaneously transports a portion of each UPTS cell under the control of a topological equivalent parallel overlapping network.

The major advantages of using the inventive distribution network architecture includes a large reduction in both hardware costs and chip real estate. This advantage occurs due, in part, to the multiple shared buffer architecture. For comparison, a conventional 64×64 Batcher-Banyan network requires 27 switching stages and thus 432 switching elements. On the other hand, the inventive distribution network, using Banyan networks, only requires 11 switching stages (165 switching elements).

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which.

DETAILED DESCRIPTION OF THE INVENTION

Figure 1:
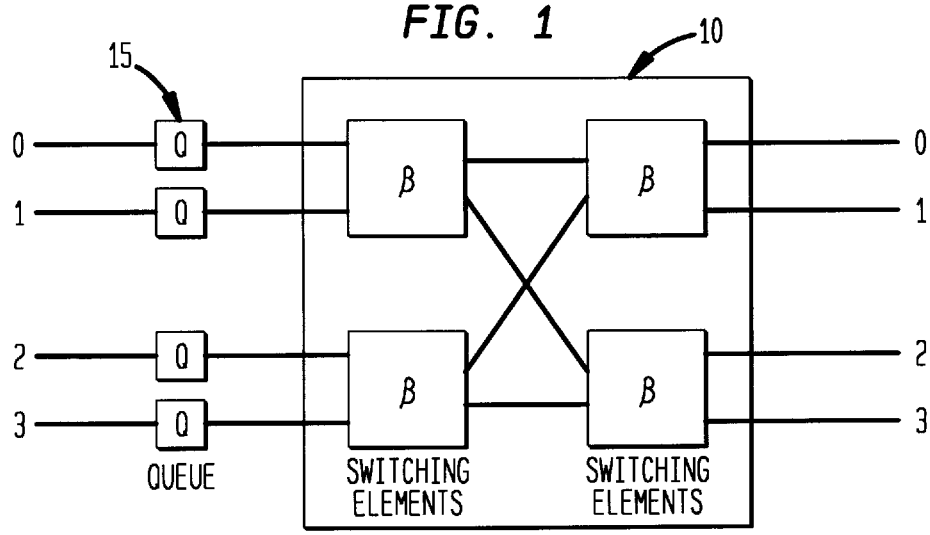
FIG. 1 shows a conventional input buffered switch.
Figure 2:
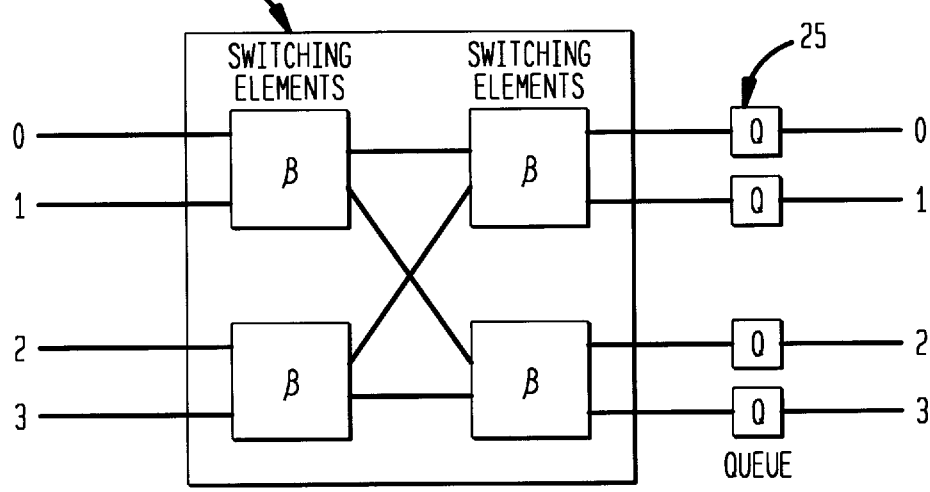
FIG. 2 shows a conventional output buffered switch.
Figure 3:
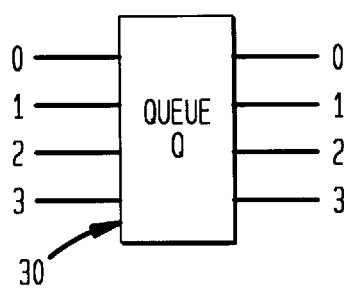
FIG. 3 shows a conventional central buffered switch.
Figure 4:
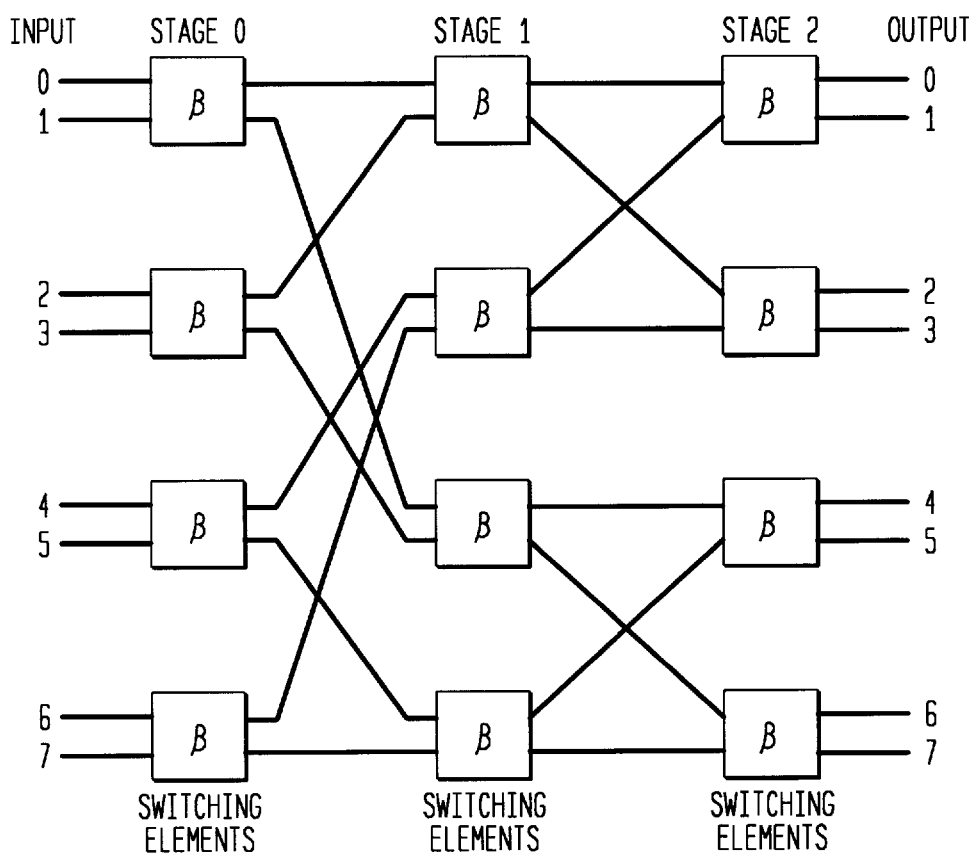
FIG. 4 illustrates an 8×8 Multistage Interconnection Network (MIN)
Figure 5:
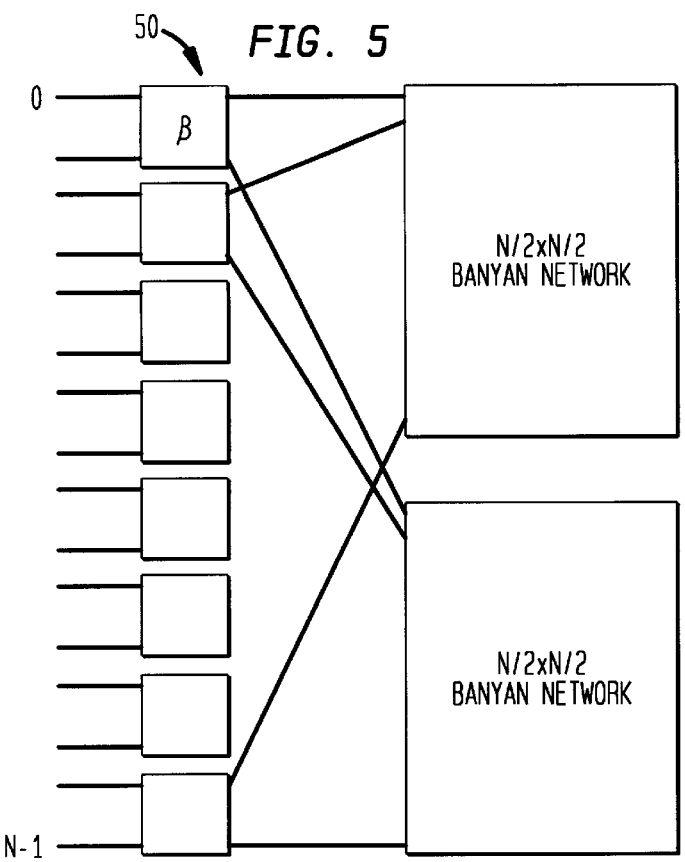
FIG. 5 illustrates an N×N Banyan Network.
Figure 6:
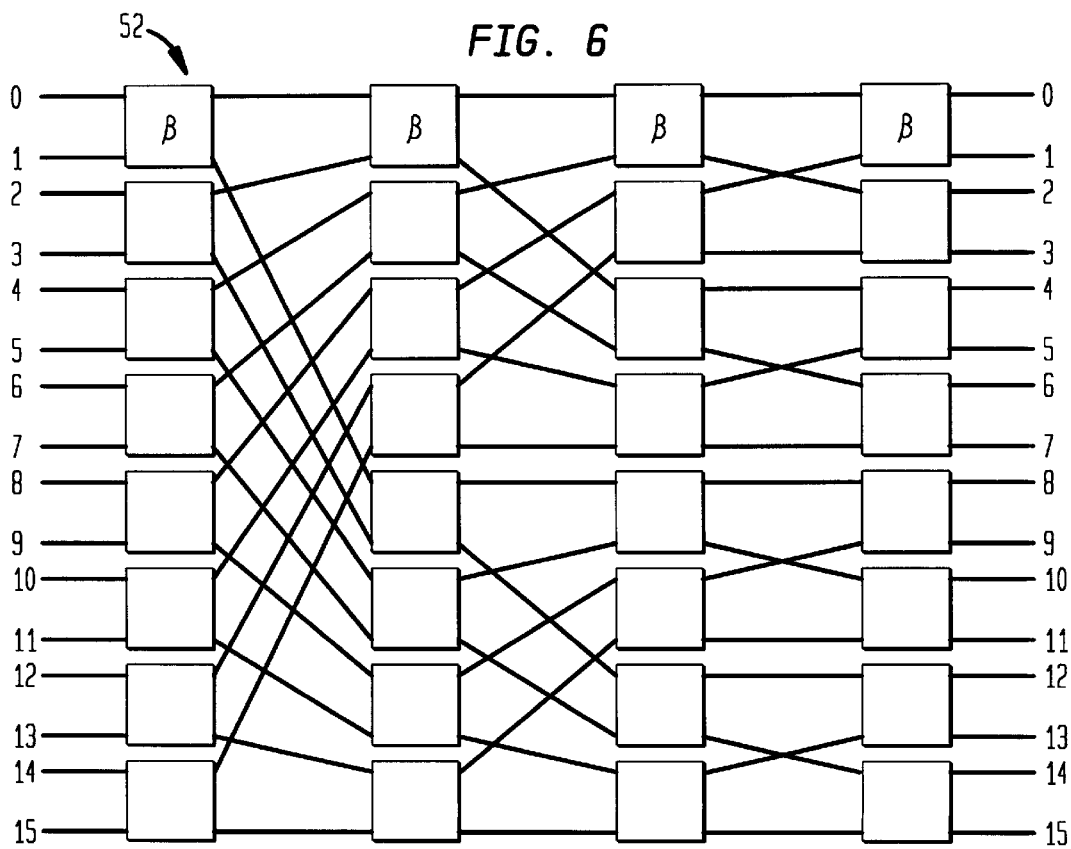
FIG. 6 illustrates a 16×16 Banyan Network.
Figure 7:
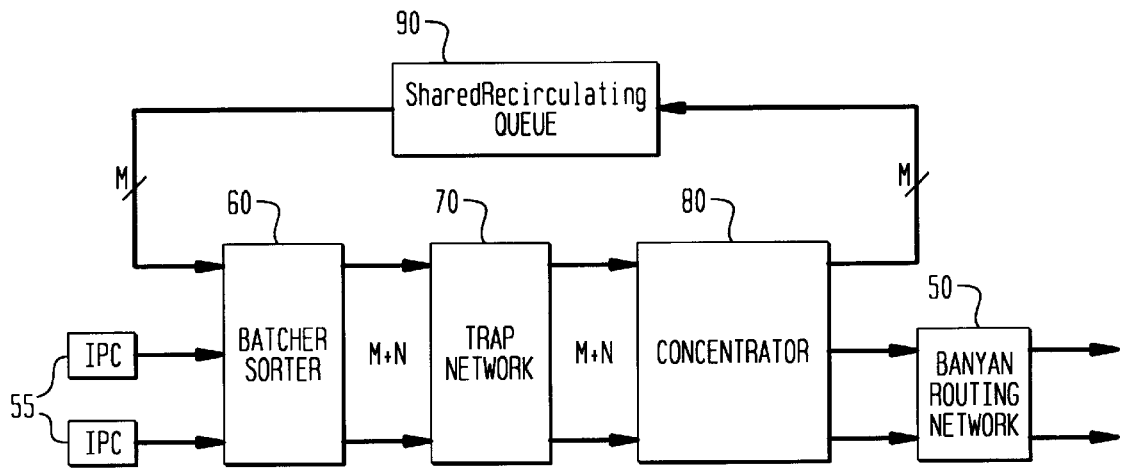
FIG. 7 shows a conventional Starlite switch.
Figure 8:
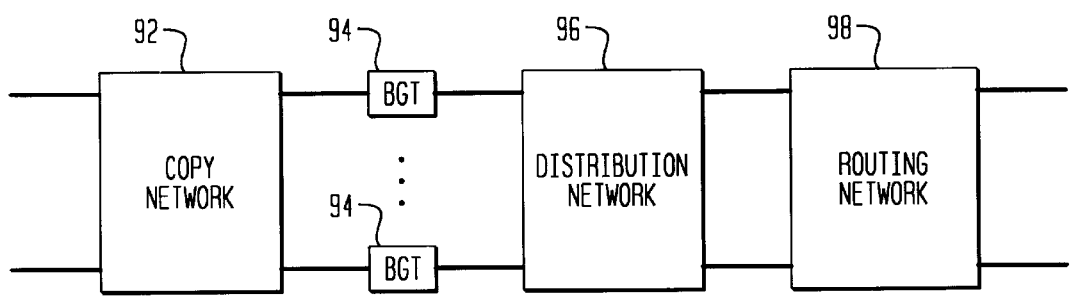
FIG. 8 shows Turner's St. Louis switching fabric.
Figure 9:
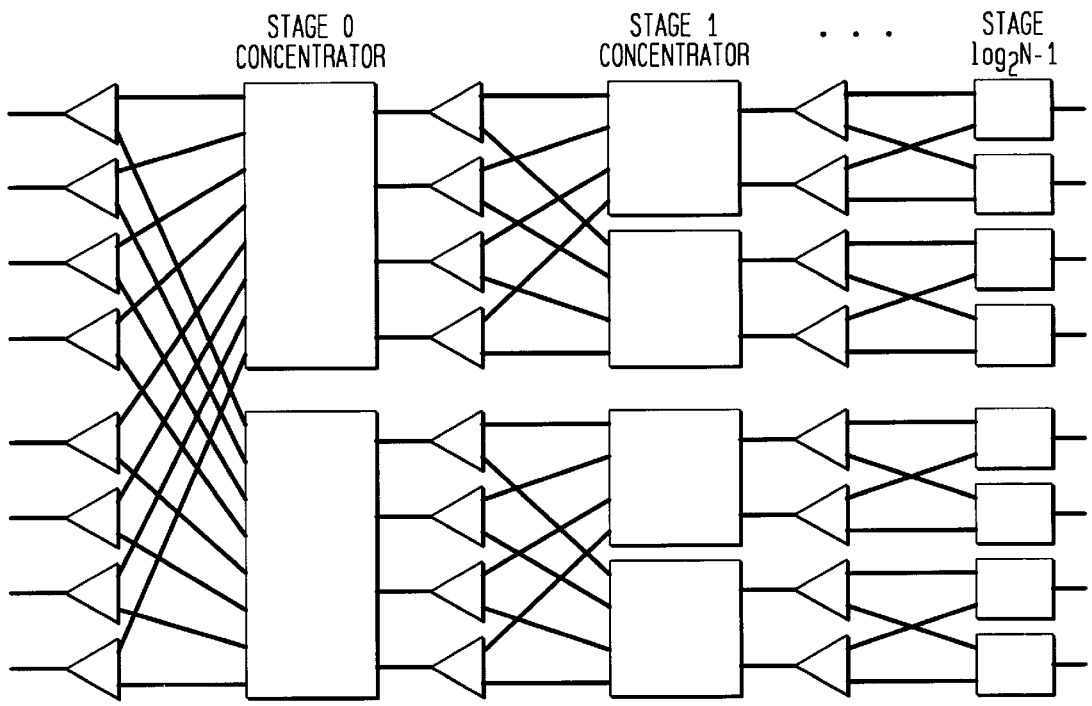
FIG. 9 shows Kim's Omega multinet switch.
Figure 10:
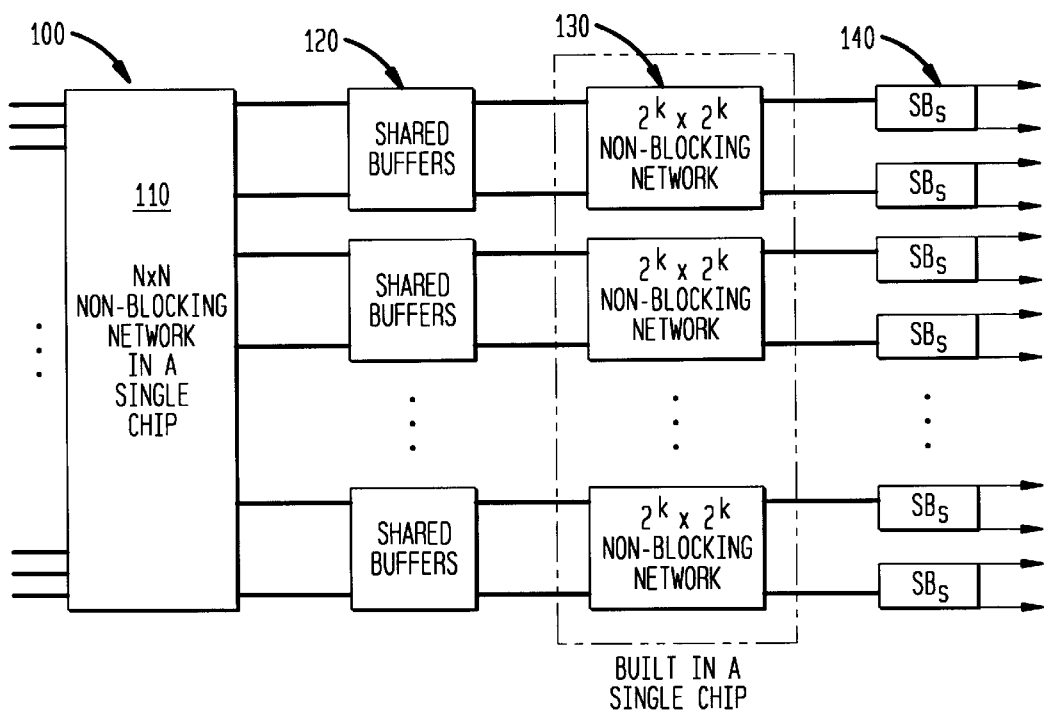
FIG. 10 shows a moderate large dimension (MLD) N×N distribution network in accordance with the present invention.
Figure 12:
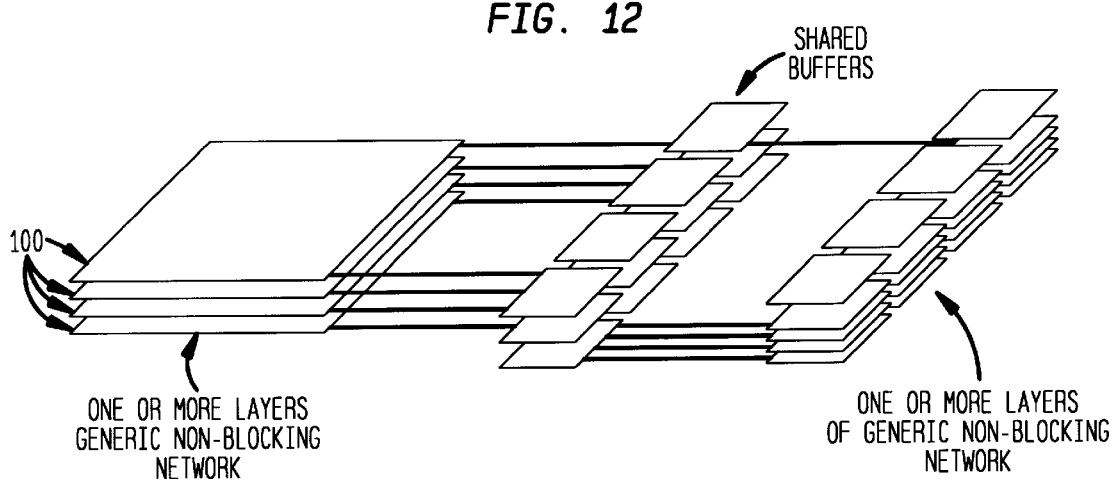
FIG. 12 shows a multiple layer distribution network in accordance with the present invention.

As shown in FIG. 10, the structure of the inventive distribution network 100 includes an N×N non-blocking routing network 110, recursively followed by $\rho^k$ groups of shared buffers 120 and $\rho^k$ groups of $(N/\rho^k) \times (N/\rho^k)$ non-blocking routing subnetworks 130, where N is the number of inputs or outputs, k is incremented from 1 to $[\log_2 N/\log_2 \rho]^{-1}$, and ρ is the speed-up factor. Note that the speed-up factor ρ should be as high as possible balanced by the fact that ρ must be lower for slower buffers. In its simplest form, distribution network 100 has N/4 groups of shared buffers, and N/4 4×4 non-blocking routing networks. Illustratively, the 4×4 non-blocking routing networks are Banyan Networks. However, Batcher-Banyan Networks, Knockout switches, bus switches, etc., can be used as well. Further, it is important to appreciate that multiple distribution networks 100 can be layered in parallel, as shown in FIG. 12.

As previously stated, many conventional ATM network switches use the "speed-up" technique to essentially eliminate input contention problems. Similarly, distribution network 100 also employs the speed-up technique. However, in conventional network switches, to ensure that there is no cell loss, the number of inputs must equal the speedup factor. Therefore, a 16×16 network necessitates a speed-up factor of 16. However, the speed-up factor is limited by the speed of the buffers that store the incoming cells. Thus, for a large switch, e.g. 1024×1024, the speed-up factor typically can not equal the number of inputs, i.e. 1024.

To overcome this problem, the inputs of distribution network 100 are organized into "speed-up channel" (SUCH) groups. A SUCH group is formed by the number of input ports modulo η, where η, fixed by the memory access time, equals the speed-up factor ρ.

Figure 11:
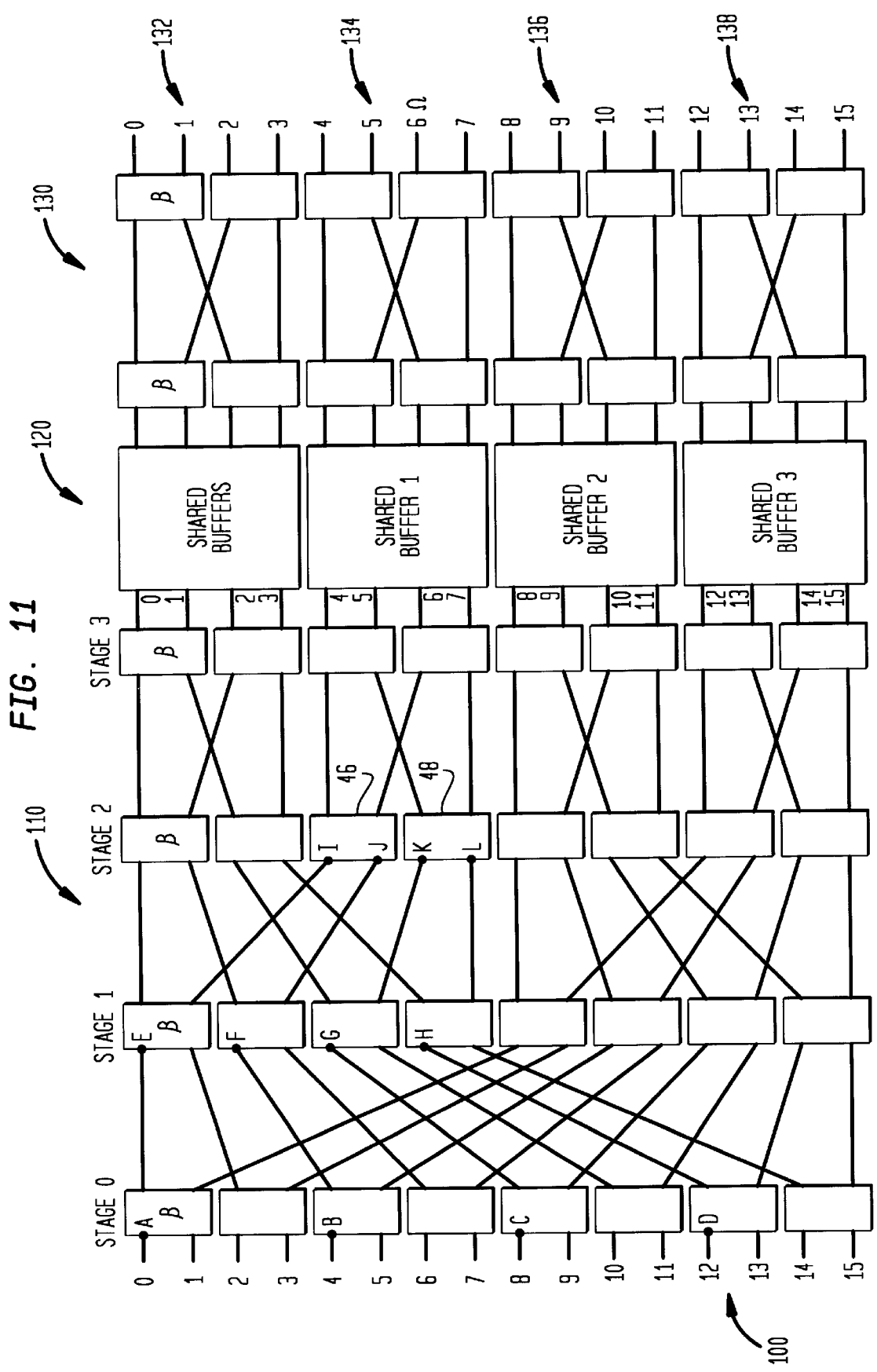
FIG. 11 shows a 16×16 distribution network in accordance with the present invention.

For example, suppose the N×N non-blocking network 110 is a 16×16 Banyan network, followed by four ($\rho^k$, where ρ=4 and k=1) groups of shared buffers 120 and four 4×4 [(N/$\rho^k$)×(N/$\rho^k$), i.e., (16/4)×(16/4)=4×4] non-blocking routing subnetworks 130. This illustration in shown in FIG. 11. If we select a speed-up factor ρ of 4 (based on the memory access time of the network), then we have 4 (16/4) SUCH groups. Since we have 4 SUCH groups, we can pair 4 inputs to each group. An example is shown in TABLE 1:

TABLE 1

| group | inputs |
|---|---|
| 0 | 0 4 8 12 |
| 1 | 1 5 9 13 |
| 2 | 2 6 10 14 |
| 3 | 3 7 11 15 |

Let T denote a clock cycle. Since ρ is equal to 4, the 16×16 Banyan network is operated at a clock rate of $t_{0,1,2,3}$=T/4. Further, let each SUCH group, 0–3, be sequentially operable during a respective $t_{0,1,2,3}$ cycle.

As indicated, SUCH group 0 consists of input ports 0, 4, 8, and 12. In the worst case scenario, suppose input ports 0, 4, 8, 12 each have to forward an incoming cell through the distribution network to the same output port 6 (Ω). Because the SUCH group is formed by the modulo η, the cells will be routed through the stages 0 and 1 of the Banyan network without conflict; however, conflicts will occur when routing through the stages 2 and 3. To overcome the internal conflicts, a simple deflection routing algorithm may be used when network conflicts occur. The algorithm will forward cells destined for the same output port to a corresponding one of the four shared buffers. Specifically, at stage 0, the 4 cells from inputs 0, 4, 8, 12 are at positions A, B, C, D, respectively. At stage 1, the 4 cells are at positions E, F, G, H, respectively. However, at stage 2, the 4 cells are at positions I, J, K, L. Notice that the cells from inputs 0 and 4 form a conflict at the switch element 46 while the cells from inputs 8 and 12 form a conflict at the switch element 48. Similarly, the cells will form a conflict at stage 3. Accordingly, the routing algorithm will allocate all of the conflicting cells destined for output 6(Ω) to the same corresponding buffer, i.e. shared buffer 1. Now, during each clock cycle t, buffer 1 will output one of the four cells to 4×4 Banyan subnetwork 134 and ultimately to output port 6 (Ω). Therefore, distribution network 100 eliminates all internal and output contention.

Figure 13:
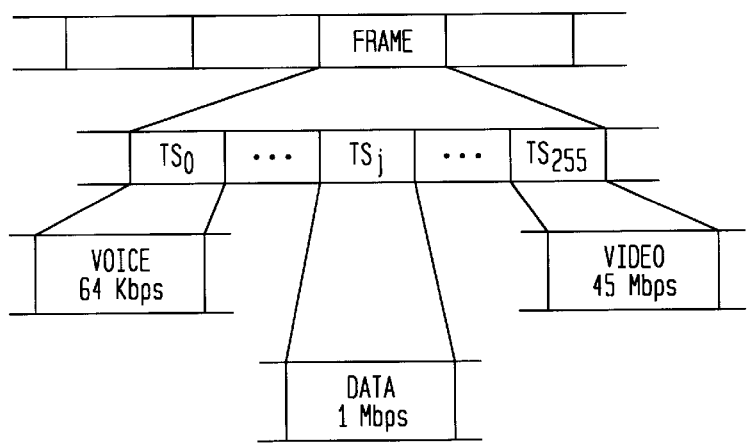
FIG. 13 illustrates an example of a UPS.

Distribution network 100 will transfer substantially any information packet such as ATM cells, variable length packets and Universal Packet TimeSlot's (UPTS) cells. The UPTS extends the timeslot concept of the Universal TimeSlot (UTS). See R. A. Thompson et al., "Experimental Modular Switching System with a Time-Multiplexed Photonic Center State", OSA Proceedings on Photonic Switching, pp. 212–218 (1989). Thompson proposed utilizing UPS in the field of photonic circuit switching system for the purpose of providing a very high speed seamless transport network. In brief, a UTS is a period of time within a frame that can contain any bit rate. The contents of the UTS is determined by the systems transmitter and the respective receiver. As shown in FIG. 13, a timeslot $TS_0$ for a voice channel may contain 64 Kbps of voice information, while the adjacent timeslots $TS_j$ and $TS_{255}$ may contain 1 Mbps of data information and 45 Mbps of video information, respectively.

Figure 14:
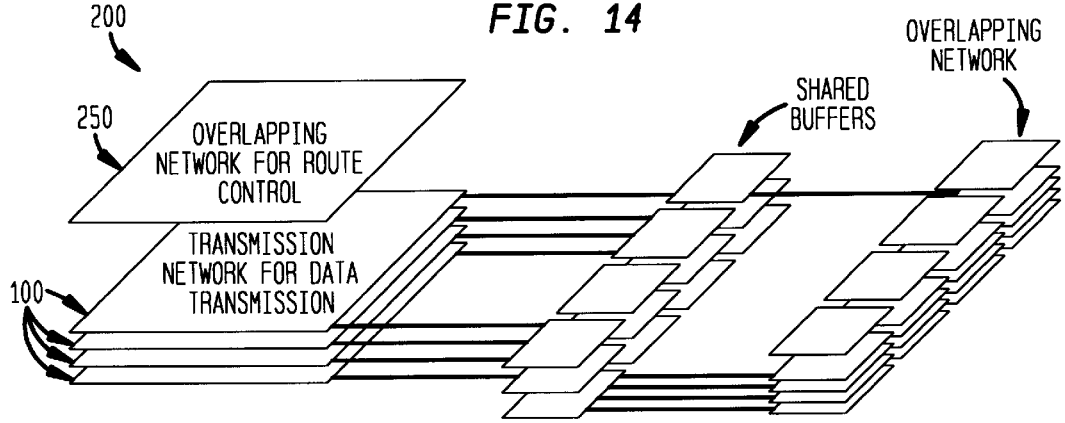
FIG. 14 shows a UPTS multiple layer distribution network in accordance with the present invention.

The primary objective of introducing the UPTS is to increment the cell size (53 bytes) within the same timeslot (e.g., let the cell size become 518 bytes (i.e., a 5 byte header and a 513 byte payload) instead of 53 bytes) so that the switch can divide the payload of each UPTS cell (i.e., transfer 518 bytes within the same ATM timeslot (2.83 μs)) into multiple units, where each unit is transmitted by a separate distribution network in parallel. As a result, the switch can route Gigabit/sec UPTS cells through the network. FIG. 14 illustrates multiple parallel distribution networks 100 which form an UPTS switch 200, in accordance with another embodiment of the invention.

Illustratively, the top N×N network 250 is called the overlapping network which controls the routing of the remaining parallel transmission networks 100. Each parallel network 100 transmits a unit of the UPTS. For example, one network 100 would transmit the first 100 bytes of the UPTS cell and another network 100 would transmit UPTS cell bytes 101–200, etc.

Utilizing UPTS in the distribution network provides very high speed packet switching. UPTS takes into account the differences between the transmission speed of the cells offered by, e.g., lightwave technology, and the processing speed of the electronic switching device. With UPTS, instead of decreasing the time unit (slot) so as to keep the cell size as a constant, the number of bits or bytes, within the same unit time, is increased. For example, if we choose 2.83 μs as the length of the UPTS timeslot for an ATM cell at a standard ATM 150 Mbps link speed and we increase the cell size from a typical 53 bytes to 213 bytes or to 518 bytes (i.e., a 208-byte payload or 512-byte payload plus a 5-byte header, respectively), the data transmission rate will increase from 150 Mbps to 602.12 Mbps [(213×8)/2.83] and 1.46 Gbps [(518×8)/2.83]. By using the UPTS technique (increasing the transmitted information unit size per timeslot unit), the inventive distribution network, shown in FIG. 14, can maintain a lower switching rate while supporting a higher data transmission rate. In other words, the speed-up factor need not be increased due to the much increased transmission rate.

UPTS switch 200 is built by overlapping a topologically equivalent shadow network for route control over a plurality of parallel distribution networks for data transmission. The major advantage of overlapping a shadow network is to use a relatively slow switching rate so that the technique of "switch-by-cell-rate" can be achieved. The switch-by-cell-rate permits the switching elements of the fabric of the distribution network to change their states once every cell duration. This allows the switching fabric to maintain the same switching rate while supporting higher transmission rates. Thus, when the parallel networks, which transmit cell data, pass current timeslot cells, the shadow network sets up routes for the subsequent timeslot cells.

The operation of UPTS switch 200 will now be described using the following example. Let T=2.83 μs denote the clock cycle and ρ=4. Hence, a 16×16 Banyan network is operated at the clock rate of t=T/4 and each SUCH group is operated at one of the t timeslots. Let the cell size equal 213 bytes or 518 bytes (instead of a typical 53 bytes). Further, let the switching fabric of switch 200 operate in a synchronous fashion. Arriving cells are processed by the input port processors (not shown). The input port processors process the received cells' VPI/VCI header information and ascertain their respective output port addresses. Since the 16×16 Banyan network acts as a distribution network, the cells are self-routing through the 16×16 Banyan network. The cells are evenly distributed to one of the shared buffers at each t cycle. Note that cells with the same output port destination are sent to the same shared buffer. With one t cycle delay, the 4×4 Banyan subnetworks are then able to pick up cells, stored in the corresponding shared buffer, and route them to their final output destinations.

The major advantages of using the inventive distribution network architecture include a reduction in both hardware costs and chip real estate. As an example, a conventional 64×64 Batcher-Banyan network requires 27 switching stages and thus 432 switches. On the other hand, the inventive distribution network, using Banyan networks, only requires 11 switching stages (165 switches). TABLE 2 illustrates the comparison of the required stages between the Batcher-Banyan network and the inventive distribution network architecture. In TABLE 2, the inventive distribution network is assumed to be ended with a 4×4 or larger Banyan subnetwork.

TABLE 2

|  | 16 × 16 | 32 × 32 | 64 × 64 | 128 × 128 | 256 × 256 | 512 × 512 | 1024 × 1024 |
| --- | --- | --- | --- | --- | --- | --- | --- |
| $\rho = 4$ (The Required Stages) | | | | | | | |
| Batcher-Banyan | 14 | 20 | 27 | 35 | 44 | 54 | 65 |
| Inventive DN (pure Banyan) | 6 | 10 | 12 | 17 | 20 | 26 | 30 |
| Inventive DN (Batcher-Banyan) | 9 | 13 | 15 | 20 | 23 | 29 | 33 |
| $\rho = 8$ (The Required Stages) | | | | | | | |
| Inventive DN (pure Banyan) | — | 7 | 13 | 13 | 15 | 18 | 23 |
| Inventive DN (Batcher-Banyan) | — | 10 | 16 | 16 | 18 | 24 | 26 |

Since any switching architecture will undoubtedly be limited by the size of the modules on a single chip, a common solution in building a large switch is to interconnect modules of identical type and size in a multistage configuration. Nonetheless, the major drawback of the multistage configuration is that it is difficult to have synchronization among connected chips. Therefore, the inventive distribution network provides a way to eliminate the drawback in the multistage configuration. To expand the inventive distribution network to a moderate large dimension (MLD) architecture, each Banyan network is built into a single chip which are interconnected by the shared buffers.

Figure 15:
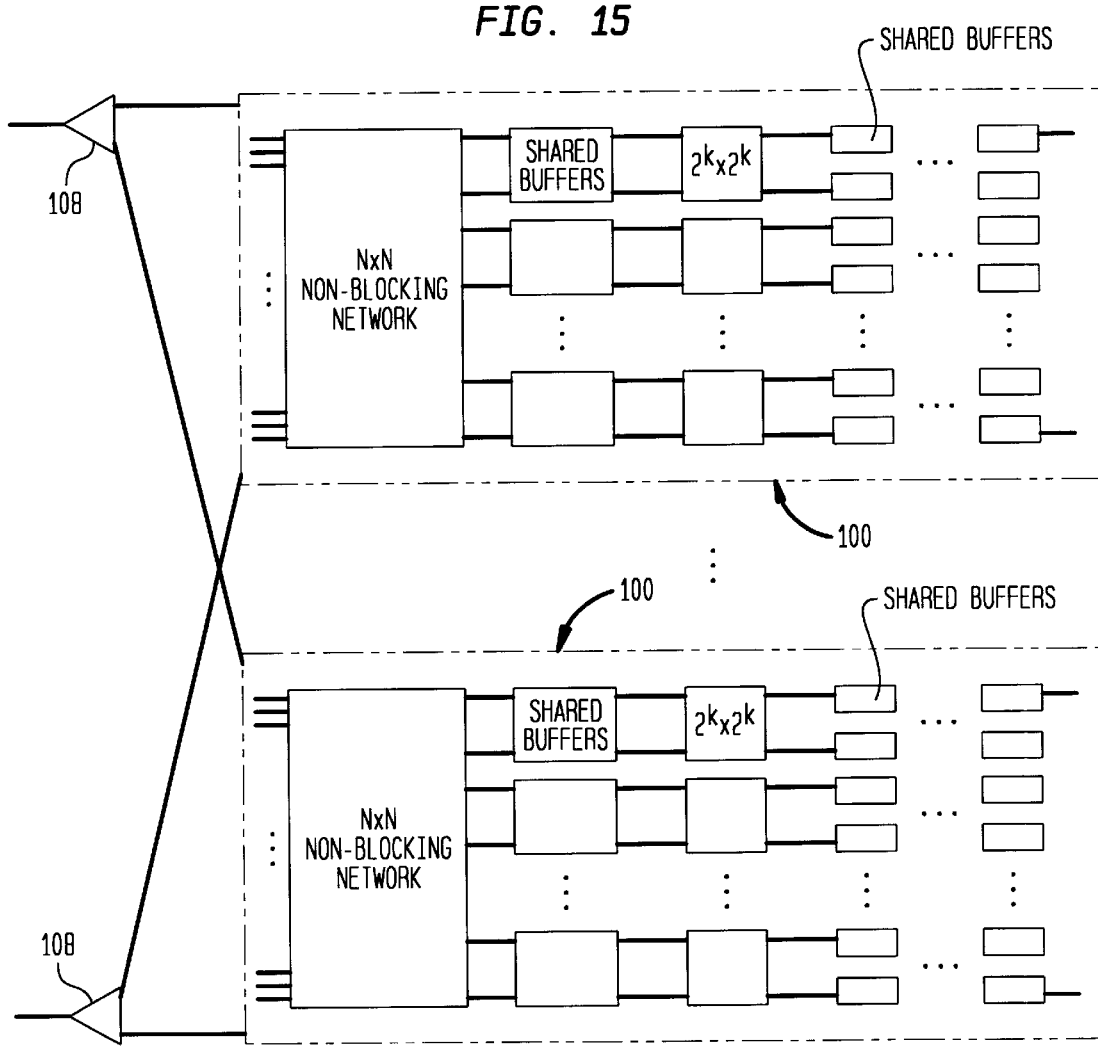
FIG. 15 shows a very large dimension (VLD) switch in accordance with the present invention.

As shown in FIG. 15, to expand the distribution network architecture from moderate large to very large dimensions, several MLD architectures 100 can be connected by demultiplexers 108. Thus, based on the first few bits of incoming cells, the most appropriate MLD distribution network is selected. Once the cells have been routed to the appropriate MLD switch, each cell will reach its destination, as described above.

Finally, the above-discussion is intended to be merely illustrative of the invention. Numerous alternative embodiments may be devised by those having ordinary skill in the art without departing from the spirit and scope of the following claims.

The claimed invention is:

1. A switch for transporting information cells without a cell contention, each of said cells having an output destination, said switch including at least one distribution network, said distribution network comprising:

an n×n first routing network for receiving said cells at a plurality of input ports, where n equals the number said input ports;

(n/$\rho$) groups of second routing networks, each having a plurality of output ports for outputting said cells based on destination addresses of said cells, wherein $\rho$ equals a predetermined speed-up factor; and (n/$\rho$) groups of shared buffers, each coupled between said first routing network and a corresponding one of said second routing networks, for storing said cells routed through said first routing network for a period of time not greater than one cell cycle, wherein all cells having the same destination address, during each cell cycle, being stored in the same shared buffer to prevent cell contention.

2. The switch of claim 1, wherein said speed-up factor $\rho$ is less than the number of said input ports N.

3. The switch of claim 1, wherein said input ports of said first routing network is grouped into a plurality of speed-up channel (SUCH) groups, wherein the size of said SUCH groups being determined by a predetermined number of input ports, and wherein the number of input ports in each of said SUCH groups equals n/$\rho$.

4. The switch of claim 3, wherein the input ports of each said SUCH group are connected to the same corresponding one of said shared buffers via a plurality of switching elements, so that said cells received in said input ports of each SUCH group are self-routed to said corresponding shared buffer.

5. The switch of claim 1, wherein said first and second routing networks are self-routing, non-blocking networks.

6. The switch of claim 5, wherein said first and second routing networks are Banyan networks.

7. The switch of claim 5, wherein said first routing network is a Batcher-Banyan network.

8. The switch of claim 1, wherein said switch includes more than one said distribution network formed in parallel.

9. The switch of claim 8, wherein each said parallel distribution network transports a portion of the information of each of said cells, such that each portion of a cell is transported simultaneously in a respective distribution network.

10. The switch of claim 1, wherein said at least one distribution network form a moderate large dimension (MLD) switch.

11. The switch of claim 10, wherein multiple MLD switches expandable by connecting said MLD switches together via demultiplexers to form a very large dimension (VLD) switch.

12. The switch of claim 1, wherein said switch transports asynchronous-transfer mode (ATM) information cells.

13. The switch of claim 1, wherein said switch transports universal packet timeslot (UPTS) information cells.

14. The switch of claim 13, wherein said switch includes more than one of said distribution network connected in parallel, wherein each parallel distribution network simultaneously transports a portion of each of said UPTS cells controlled by a topological parallel overlapping network.

15. A switch for transporting information cells without a cell contention, each of said cells having an output destination, comprising:

an n×n first routing network for receiving said cells at a plurality of input ports, where n equals the number of said input ports;

$\rho^k$ groups of ([N]n/$\rho$k)×([N](n/$\rho$k) second routing networks, each having a plurality of output ports for outputting said cells based on destination addresses of said cells, wherein k is incremented from 1 to $[\log_2[N] n/\log_2\rho]^{-1}$ and $\rho$ equals a predetermined speed-up factor; and $\rho^k$ groups of shared buffers, each coupled between said first routing network and a corresponding one of said second routing networks, for storing said cells routed through said first routing network for a period of time not greater than one cell cycle, wherein all cells having the same destination address, during each cell cycle, being stored in the same shared buffer to prevent a said cell connection.

16. The switch of claim 15, wherein said speed-up factor $\rho$ is less than the number of said input ports n.

17. The switch of claim 15, wherein said input ports of said first routing network is grouped into a plurality of speed-up channel (SUCH) groups, wherein the size of said SUCH groups being determined by a predetermined number of input ports, and wherein the number of input ports in each of said SUCH groups equals $n/\rho$.

18. The switch of claim 17, wherein the input ports of each said SUCH group are connected to the same corresponding one of said shared buffers via a plurality of switching elements, so that said cells received in said input ports of each SUCH group are self-routed to said corresponding shared buffer.

19. The switch of claim 15, wherein said first and second routing networks are self-routing, non-blocking networks.

20. The switch of claim 19, wherein said first and second routing networks are Banyan Networks.

21. The switch of claim 19, wherein said first routing network is a Batcher-Banyan Network.

22. The switch of claim 15, wherein said switch includes more than one distribution network formed in parallel.

23. The switch of claim 22, wherein each parallel distribution network transports a portion of the information of each of said cells, such that each portion of a cell is transported simultaneously in a respective distribution network.

24. The switch of claim 15, wherein said at least one parallel distribution network form a moderate large dimension (MLD) switch.

25. The switch of claim 24, wherein multiple MLD switches expandable by connecting said MLD switches together via demultiplexers to form a very large dimension (VLD) switch.

26. The switch of claim 15, wherein said switch transports asynchronous transfer mode (ATM) information cells.

27. The switch of claim 15, wherein said switch transports universal packet timeslot (UPTS) information cells.

28. The switch of claim 27, wherein said switch includes more than one distribution network connected in parallel, wherein each parallel distribution network simultaneously transports a portion of each of said UPTS cells under the control of a topological equivalent parallel overlapping network.

* * * * *